United States Patent [19]
Yamamoto et al.

[11] 4,264,889
[45] Apr. 28, 1981

[54] PRESSURE TRANSDUCER

[75] Inventors: Yoshimi Yamamoto, Ibaraki; Mitsuo Ai, Katsuta; Yoshitaka Matsuoka, Mito; Takeo Nagata, Hitachi; Tsutomu Okayama, Katsuta; Akira Ikegami, Yokohama, all of Japan

[73] Assignee: Hitachi, Ltd., Tokyo, Japan

[21] Appl. No.: 113,208

[22] Filed: Jan. 18, 1980

Related U.S. Application Data

[63] Continuation of Ser. No. 954,123, Oct. 24, 1978, abandoned.

[30] Foreign Application Priority Data

Oct. 26, 1977 [JP] Japan ................................ 52-128406

[51] Int. Cl.³ .............................................. G01L 1/22
[52] U.S. Cl. ...................................... 338/42; 73/708;
  73/721; 338/3; 338/4
[58] Field of Search .......................... 338/2-5,
  338/36, 42, 7-9; 73/708, 720, 121, 726, 727;
  29/610 SG

[56] References Cited

U.S. PATENT DOCUMENTS

| | | | |
|---|---|---|---|
| 3,290,928 | 12/1966 | Curry | 73/766 |
| 3,389,362 | 6/1968 | McLellan | 338/42 X |
| 4,017,819 | 4/1977 | Pien | 338/36 X |
| 4,135,408 | 1/1979 | DiGiovanni | 73/721 |

Primary Examiner—C. L. Albritton
Attorney, Agent, or Firm—Craig and Antonelli

[57] ABSTRACT

A pressure transducer has at least one pressure transmitting space filled with liquid, a space for a pressure to be sensed connected to the pressure transmitting space through a diaphragm, and a pressure sensitive element in the pressure transmitting space for transducing a pressure transmitted from the space for the pressure to be sensed to the pressure transmitting space through the diaphragm to an electrical signal. A printed circuit board wired to electrically connect terminals of the pressure sensitive element is arranged closely to the element and thin temperature sensitive elements for temperature-compensating the pressure sensitive element are arranged on the printed circuit board.

9 Claims, 2 Drawing Figures

PRESSURE TRANSDUCER

This is a continuation of application Ser. No. 954,123, filed Oct. 24, 1978 now abandoned.

BACKGROUND OF THE INVENTION

1. Field of the Invention

The present invention relates a pressure transducer for sensing a pressure or a differential pressure, and more particularly to a pressure transducer which introduces a pressure in a space for a pressure to be sensed to a pressure transmitting space through a diaphragm and senses the pressure in the space for the pressure to be sensed by a pressure sensitive element disposed in the pressure transmitting space.

2. Description of the Prior Art

The pressure transducer of the type described above transduces the pressure in the pressure transmitting space to a mechanical strain, which is then transduced to an electrical quantity, and it usually uses a vapor deposition type strain gauge or a diffusion type strain gauge. The diffusion type strain gauge is manufactured by diffusing impurity into a silicon base diaphragm, and it is commonly referred to as a semiconductor strain gauge. Since the semiconductor strain gauge has much higher gauge rate than a wire strain gauge, it is widely used in the field of pressure sensing. However, since the semiconductor strain gauge is highly influenced by a temperature, a temperature compensation is needed. For the temperature compensation, it is advisable to arrange a temperature sensitive element such as a thermistor closely to the semiconductor strain gauge. On the other hand, since the pressure transmitting space is filled with liquid such as silicone oil, it is necessary to prevent the change of volume of the liquid by temperature change from affecting to the pressure in the pressure transmitting space. To this end, the volume of the space is designed as small as possible.

The arrangement of electric components such as temperature sensitive element in the pressure transmitting space results in the increase of the volume of the pressure transmitting space because a space for means for holding the electric components is necessary in addition to a space for the electric components. Heretofore, the electric components have been arranged outside the space through a hermetic seal. Since the temperature sensitive element must be located at a position which is subjected to the same temperature as the pressure sensitive element is subjected to, it has been disposed as closely to the pressure sensitive element as possible outside the pressure transmitting space.

Recently, higher presision has been required for the pressure transducer. Where the temperature sensitive element is spaced from the pressure sensitive element by other members like in the prior art transducer, a high precision pressure transducer is not attained because of a temperature difference between both elements due to temperature change in the space for the pressure to be sensed or change of surrounding temperature.

SUMMARY OF THE INVENTION

It is an object of the present invention to provide a pressure transducer which is constructed to enable the close arrangement of the temperature sensitive element and the pressure sensitive element within a common space.

According to the present invention, a printed circuit board having a wiring pattern to be connected with wiring pads of the pressure sensitive element is arranged closely to the pressure sensitive element, and thin temperature sensitive elements are arranged to the printed circuit board.

DETAILED DESCRIPTION OF THE PREFERRED EMBODIMENT

Figure 1:
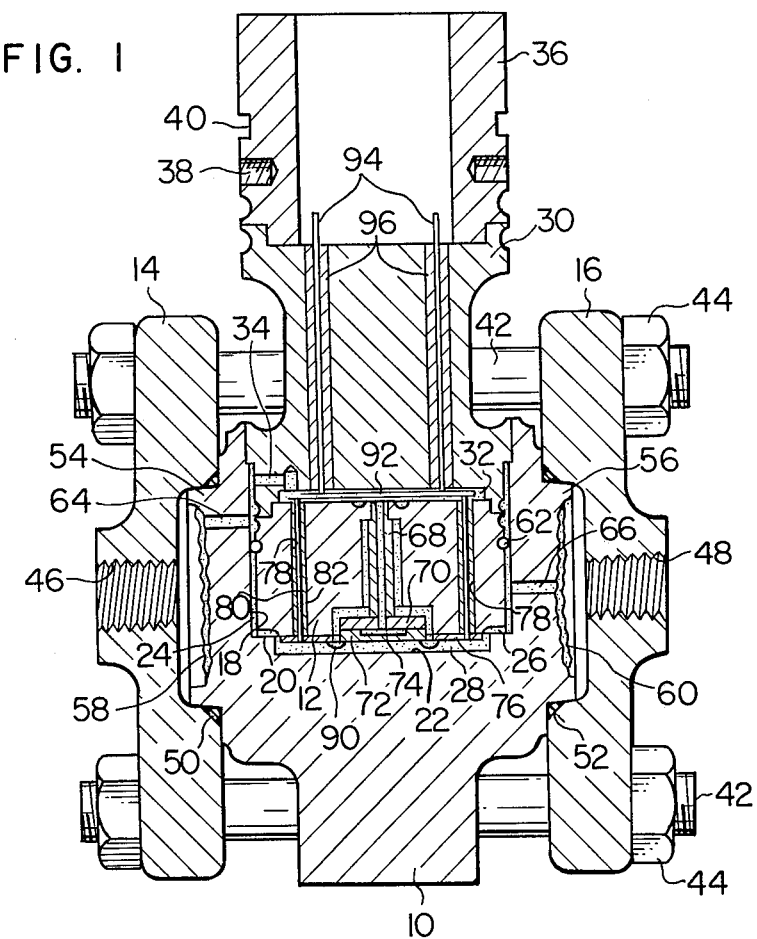
FIG. 1 is a longitudinal sectional view of a pressure transducer in accordance with the present invention.

Referring to FIG. 1, a pressure transducer in accordance with the present invention mainly comprises a housing 10, a cylindrical support 12 and flanges 14 and 16. The housing 10 has a generally rectangular periphery and a center portion including a cylindrical inner wall 18 and a bottom 22 having a step 20. The support 12 is mounted on the step 20 with a space 24 being formed between the peripheral surface of the support 12 and the inner wall 18 of the housing 10. A plurality of radially extending grooves 26 are formed in the bottom of the support 12 to communicate the space 24 with a space 28 above the bottom 22.

Mounted on the support 12 is a connecting member 30, and junction on circumferential walls of the support 12 and the member 30 is welded over the entire circumference. A space 32 is defined between the top surface of the support 12 and the connecting member 30, and the space 32 communicates with the space 24 through a via-hole 34 formed in the connecting member 30. A cylindrical member 36 is mounted on the connecting member 30 and both members are welded together along circumferential junction. A case for accomodating electric components is attached to the cylindrical member 36 by a female screw 38. The interior of the case is sealed by an O-ring disposed in a ring groove 40.

Rectangular flanges 14 and 16 are clamped to both sides of the housing 10 at their corners by bolts 42 and nuts 44. The flanges 14 and 16 have connecting threads 46 and 48, respectively, on inner circumferential surfaces of via-holes for connecting conduits, not shown, extending to the space for the pressure to be sensed. Sealing packings 50 and 52 are arranged between the housing 10 and the flanges 14 and 16, respectively. Seal diaphragms 58 and 60 are attached, by tig welding, to inner walls of ring projections 54 and 56 on the support 12 which fit to the flanges 14 and 16. The space 24 is divided into two spaces by an O-ring 62. Each space is filled with silicone oil, which is charged to the seal diaphragm 58 or 60 through hole 64 or 66.

A via-hole having two steps is formed at the center of the support 12 made of steel, and a cylindrical holder 68 made of iron-nickel alloy or iron-nickel-cobalt alloy is welded to the smallest diameter portion at the top of the via-hole, and a ring interposer 70 made of glass is attached to the bottom of the holder 68 in liquid tight manner, and a pressure sensitive element 72 made of semiconductor such as silicon and having a diaphragm 74 at the center thereof is attached to the bottom of the interposer 70 in liquid tight manner.

Thermal expansion coefficients of the cylindrical holder 68 and the interposer 70 are selected to be intermediate thermal expassion coefficients of the holder 12 and the pressure sensitive element 72, with the thermal expansion coefficient of the holder 68 being closer to that of holder 12 than that of the interposer 70. By this arrangement, a strain to the pressure sensitive element due to temperature change is minimized. A pressure applied to the diaphragm 58 is applied to the upper surface of the diaphragm 74 through the via-hole 64, the via-hole 34, the space 32 and the central bores of the cylindrical holder 68 and the interposer 70. On the other hand, a pressure applied to the diaphragm 60 is applied to the lower surface of the diaphragm 74 through the via-hole 66 and the groove 26. Consequently, the diaphragm 74 produces a strain which is proportional to a differential pressure.

Impurities have been diffused at a plurality of areas on the lower surface of the diaphragm 74 to construct a semiconductor strain gauge. A doughnut-shaped ceramic printed circuit board 76 is mounted on the lower surface of the holder 12. It is solder-bonded to conductors 80 which extend through thirteen via-holes 78 extending along center axis of the support 12 on a common circumference. The conductors 80 are supported by hermetic seals 82 disposed in the via-holes. The lower surface of the printed circuit board 76 is positioned at a substantially same level as the lower surface of the diaphragm 74.

Figure 2:
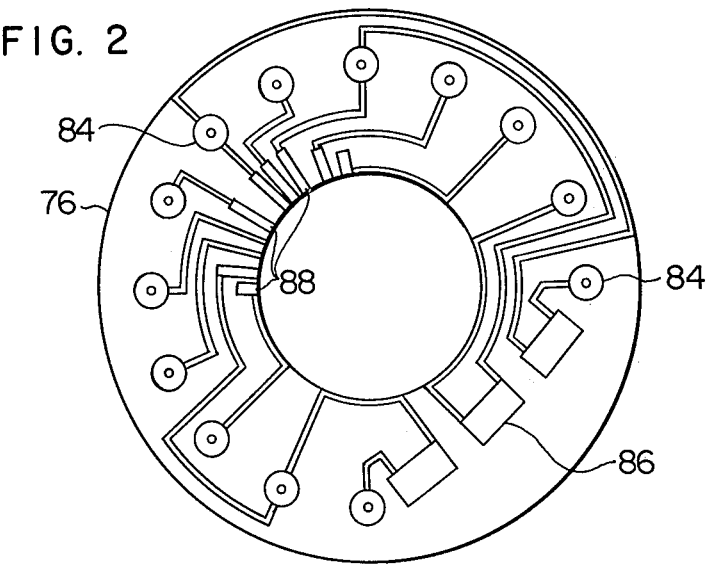
FIG. 2 is an enlarged bottom view of a printed circuit board arranged closely to a pressure sensitive element.

As shown in FIG. 2, the printed circuit board 76 carries printed wiring which includes thirteen soldering printed pads 84 along a common circumference. Those pads 84 are solder-bonded to the conductors 80 extending through the hermetic seal 82. The printed circuit boards 76 further has three thick film thermistors 86 printed and baked with the wiring pattern. The thermistors may be of thin film, vapor deposition type or thin plate, bonded type. The wiring pattern includes ten bonding pads 88 to be connected with wiring pads of the pressure sensitive element 72. The wiring pads of the pressure sensitive element 72 and the bonding pads 88 are connected together through ultrasonic wave bonded leads 90. By positioning the lower surface of the printed circuit board 76 at the substantially same level as the lower surface of the pressure sensitive element 72, the welding work of the leads 90 is facilitated and the space 28 can be reduced.

The conductors 80 extending through the hermetic seal 82 have their copper ends connected to wiring pattern of a flexible printed circuit board 92, which is folded back into a generally disk shape. Wiring pattern on the upper plate and wiring pattern on the lower plate are electrically interconnected at folding portion. The lower plate of the printed circuit board 92 is held on the conductors 80 by connecting the wiring pattern on the lower plate to the conductors 80 while leaving a space from the upper surface of the support 12. Thus, the space 32 communicates with the center bore of the cylindrical holder 68 through the space between the lower plate of the printed circuit board 92 and the holder 12. The upper plate of the printed circuit boards 92 is held on a plurality of conductors 94 by connecting the wiring pattern on the upper plate to the conductors 94, which extend through a hermetic seal 96 and thirteen via-holes formed in the connecting member 30 on a common circumference. The conductors 94 are connected to an electrical circuit accomodated in a case fixed to the cylindrical member 36.

According to the present invention, input pressures to be sensed are received at the flange 14 and the flange 16. Thus, a differential pressure therebetween may be sensed, or one pressure may be used as a reference pressure to measure the other pressure. In the latter case, the reference pressure port may be opened to an atmosphere or it may be connected to a predetermined pressure source.

Furthermore, according to the present invention, the pressure to be sensed may be a pressure derived from transducing a weight of article to the pressure. In this case, a weight transducer is provided.

We claim:

1. A pressure transducer comprising a pressure transmitting space filled with liquid, a space for a pressure to be sensed connected to said pressure transmitting space through a diaphragm, a pressure sensitive element disposed in said pressure transmitting space for transducing a pressure in said pressure transmitting space to an electrical signal, a printed circuit board disposed closely to said pressure sensitive element in said pressure transmitting space, said printed circuit board having conductors to be electrically connected with terminals of said pressure sensitive element, printed thereon, at least one thin plate temperature sensitive element mounted on said printed circuit board for temperature-compensating said pressure sensitive element, and conductors for conducting leads from said printed circuit board to the exterior of said pressure transmitting space through a seal.

2. A pressure transducer comprising a pair of pressure transmitting spaces filled with liquid, a pair of spaces for pressure to be sensed connected to respective ones of said pair of pressure transmitting spaces through separate diaphragms, a pressure sensitive element arranged to receive the pressures in said pair of pressure transmitting spaces in opposite direction to each other for transducing a differential pressure therebetween to an electrical signal, a printed circuit board disposed closely to said pressure sensitive element in at least one of said pair of pressure transmitting spaces, said printed circuit board having conductors to be electrically connected with terminals of said pressure sensitive element, printed thereon, at least one thin plate temperature sensitive element mounted on said printed circuit board for temperature-compensating said pressure sensitive element, and conductors for conducting leads from said printed circuit board to the exterior of said pressure transmitting space through a seal.

3. A pressure transducer according to claim 1 or 2, wherein a surface of said pressure sensitive element which receives a pressure and transduces the pressure to a corresponding electric signal is arranged at substantially the same level as a surface of said printed circuit board on which said temperature sensitive element is mounted.

4. A pressure transducer according to claim 3, wherein said printed circuit board at least partially surrounds said pressure sensitive element.

5. A pressure transducer according to claim 1 or 2, wherein said temperature sensitive element is a thick film temperature sensitive element.

6. A pressure transducer according to claim 1 or 2, wherein said pressure sensitive element is a semiconductor strain gauge comprising a semiconductor substrate having a diaphragm, into which impurity has been diffused.

7. A pressure transducer according to claim 6, wherein said semiconductor substrate is held by a member defining said pressure transmitting space through at least two materials, thermal expansion coefficients of said materials changing from a thermal expansion coefficient close to that of said member to a thermal expansion coefficient close to that of said semiconductor substrate in the order of said materials arranged in the direction from said member to said semiconductor substrate.

8. A pressure transducer according to claim 7, wherein said member is steel, said semiconductor substrate is silicon, and said semiconductor substrate is held by said member through an iron-nickel alloy and glass in this order.

9. A pressure transducer comprising:
a support member in which a through hole is formed;
a holder member fixed to said support member at one end thereof, said holder member having a center hole communicating with said through hole;
a pressure sensitive element fixed to the other end of said holder member so that said pressure sensitive element is arranged to cover said center hole, said pressure sensitive element converting the pressure applied thereto into an electric signal;
a printed circuit board mounted on said support member adjacent to said pressure sensitive element, said printed circuit board carrying conductors which are electrically connected with terminals of said pressure sensitive element; and
at least one thin plate temperature sensitive element arranged on said printed circuit board for temperature-compensating said pressure sensitive element;
wherein said pressure transducer transduces a differential pressure between a pressure in a space on one side of said pressure sensitive element which is communicated with a space for a pressure in said through hole and said center hole and a pressure in a space on the other side of said pressure sensitive element to an electric signal.

* * * * *